(12) United States Patent
Aichele et al.

(10) Patent No.: US 9,811,074 B1
(45) Date of Patent: Nov. 7, 2017

(54) OPTIMIZATION OF ROBOT CONTROL PROGRAMS IN PHYSICS-BASED SIMULATED ENVIRONMENT

(71) Applicant: TruPhysics GmbH, Stuttgart (DE)

(72) Inventors: Fabian Aichele, Leinfelden-Echterdingen (DE); Albert Groz, Stuttgart (DE)

(73) Assignee: TruPhysics GmbH, Stuttgart (DE)

( * ) Notice: Subject to any disclaimer, the term of this patent is extended or adjusted under 35 U.S.C. 154(b) by 0 days.

(21) Appl. No.: 15/614,489

(22) Filed: Jun. 5, 2017

Related U.S. Application Data

(63) Continuation-in-part of application No. 15/188,932, filed on Jun. 21, 2016, now Pat. No. 9,671,777.

(51) Int. Cl.
G06F 19/00 (2011.01)
G05B 19/4069 (2006.01)
G06N 7/04 (2006.01)
B25J 9/16 (2006.01)

(52) U.S. Cl.
CPC ........ *G05B 19/4069* (2013.01); *B25J 9/1605* (2013.01); *B25J 9/1656* (2013.01); *B25J 9/1666* (2013.01); *G06N 7/04* (2013.01)

(58) Field of Classification Search
None
See application file for complete search history.

*Primary Examiner* — Bhavesh V Amin
(74) *Attorney, Agent, or Firm* — Georgiy L. Khayet

(57) ABSTRACT

A disclosed system includes a physically plausible virtual runtime environment to simulate a real-life environment for a simulated robot and a test planning and testing component to define a robotic task and generate virtual test cases for the robotic task. The test planning and testing component is further operable to generate virtual test cases for the robotic task, determine a control strategy for executing the virtual test cases, and create the physics-based simulated environment. The system further includes a robot controller operable to execute the virtual test cases in parallel in the physics-based simulated environment, measure a success of the execution, and store training and validation data to a historical database to train a machine learning algorithm. The robot controller may continuously execute the virtual test cases and use the machine learning algorithm to adjust parameters of the control strategy until optimal test cases are determined.

18 Claims, 7 Drawing Sheets

OPTIMIZATION OF ROBOT CONTROL PROGRAMS IN PHYSICS-BASED SIMULATED ENVIRONMENT

CROSS-REFERENCE TO RELATED APPLICATIONS

This application is a continuation-in-part of U.S. patent application Ser. No. 15/188,932, entitled "TRAINING ROBOTS TO EXECUTE ACTIONS IN PHYSICS-BASED VIRTUAL ENVIRONMENT", filed on Jun. 21, 2016, which is incorporated herein by reference in its entirety.

TECHNICAL FIELD

This disclosure relates generally to testing robots and, more specifically, to testing robots in a physics-based simulation environment.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Conventionally, robots can be programmed using a method in which a human can bring a robot into the right position by a teaching pendant. Solutions for programming robots can include off-line programming to create a program independent of an actual robot cell. The robot program can be uploaded to a physical industrial robot for execution. The robot cell may be represented via a graphical three-dimensional model in a simulator. The off-line programming and simulator tools can be used to create optimized program paths for the robot to perform a specific task. The simulation of the robot program may be based on robot movements, reachability analysis, collision and near-miss detection, cycle time reporting, and other factors.

The degrees of complexity of control programs very and may include deterministic sequences of trajectories and plug-and-play applications in which no dynamic modifications to trajectories are necessary. Assembly and handling tasks are examples of robotic applications that may need to compensate variations in work piece positions (including search strategies to detect target points). Such tasks can require live information from the working environment in order to dynamically react to changing states and conditions. Partially or fully automated robotic applications are even more complex, as they require the online execution and coordination of numerous tasks (e.g., localization and mapping, object recognition, and handling) to enable robots to achieve their tasks. The idea to use simulation software for both designing and verifying control programs and algorithms in both industrial and service robotics has been known, as can be seen from a wide variety of software applications currently available (e.g., Gazebo, Webots, KUKA SimPro, and Siemens RobotExpert). However, these simulation frameworks are currently not suitable for testing processes for interaction with real environment in a high degree of mechanical interaction between tools and work pieces. Additionally, these simulation networks are highly dependent on real-time sensor data from the working environment. The simulation frameworks are often restricted in their ability with highly detailed geometric models of robots, tools, work pieces, and other objects for contacts or overlaps in or close to real-time.

Additionally, the simulation software may need constant operator supervision. More specifically, an operator may need to review results of the execution of operations by the simulation software and determine which parameters need to be adjusted to obtain successful results of execution. The operator may further need to manually run the simulation software with the adjusted parameters. However, determination of the parameters to be adjusted may include a complex analysis and additional processing devices may need to be involved in the analysis.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure relates to systems and methods for optimizing a robot control program in a physics-based simulated environment using machine learning. According to one embodiment of the disclosure, a system for optimizing a robot control program in a physics-based simulated environment using machine learning may include a physically plausible virtual runtime environment to simulate a real environment for a simulated robot, a test planning and testing component, and a robot controller. The test planning and testing component may be operable to define a robotic task. Furthermore, the test planning and testing component may be operable to generate a plurality of virtual test cases for the robotic task. The test planning and testing component may be further operable to determine a control strategy for executing the plurality of virtual test cases and initial parameters for the control strategy. Furthermore, the test planning and testing component may be operable to create the physics-based simulated environment. The robot controller may be operable to execute the plurality of virtual test cases in parallel based on the control strategy in the physics-based simulated environment. The robot controller may be further operable to measure a success of the execution of each of the plurality of virtual test cases. The robot controller may be operable to store training and validation data to a historical database. The training and validation data may include at least measurements of success of the execution of the plurality of virtual test cases. The robot controller may train a machine learning algorithm using the training and validation data. Furthermore, the robot controller may continuously execute the plurality of virtual test cases while using the machine learning algorithm to adjust parameters of the control strategy until one or more optimal test cases are determined.

In another embodiment of the disclosure, a method for optimizing a robot control program in a physics-based simulated environment using machine learning is provided. The method may commence with defining a robotic task. Thereafter, the method may continue with generating a plurality of virtual test cases for the robotic task. The method may further include determining a control strategy for executing the plurality of virtual test cases and initial parameters for the control strategy. Furthermore, the method may include creating the physics-based simulated environment. The method may continue with executing the plurality of virtual test cases in parallel in the physics-based simulated environment. The execution of the plurality of virtual test cases may be performed based on the control strategy. Furthermore, the method may include measuring a success of the execution of each of the plurality of virtual test cases. The method may continue with storing training and validation data to a historical database. The training and validation data may include at least measurements of success of the execution of the plurality of virtual test cases. The training and validation data may be used to train a machine learning algorithm. The method may continue with continuously executing the plurality of virtual test cases while using the machine learning algorithm to adjust parameters of the control strategy until one or more optimal test cases are determined.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
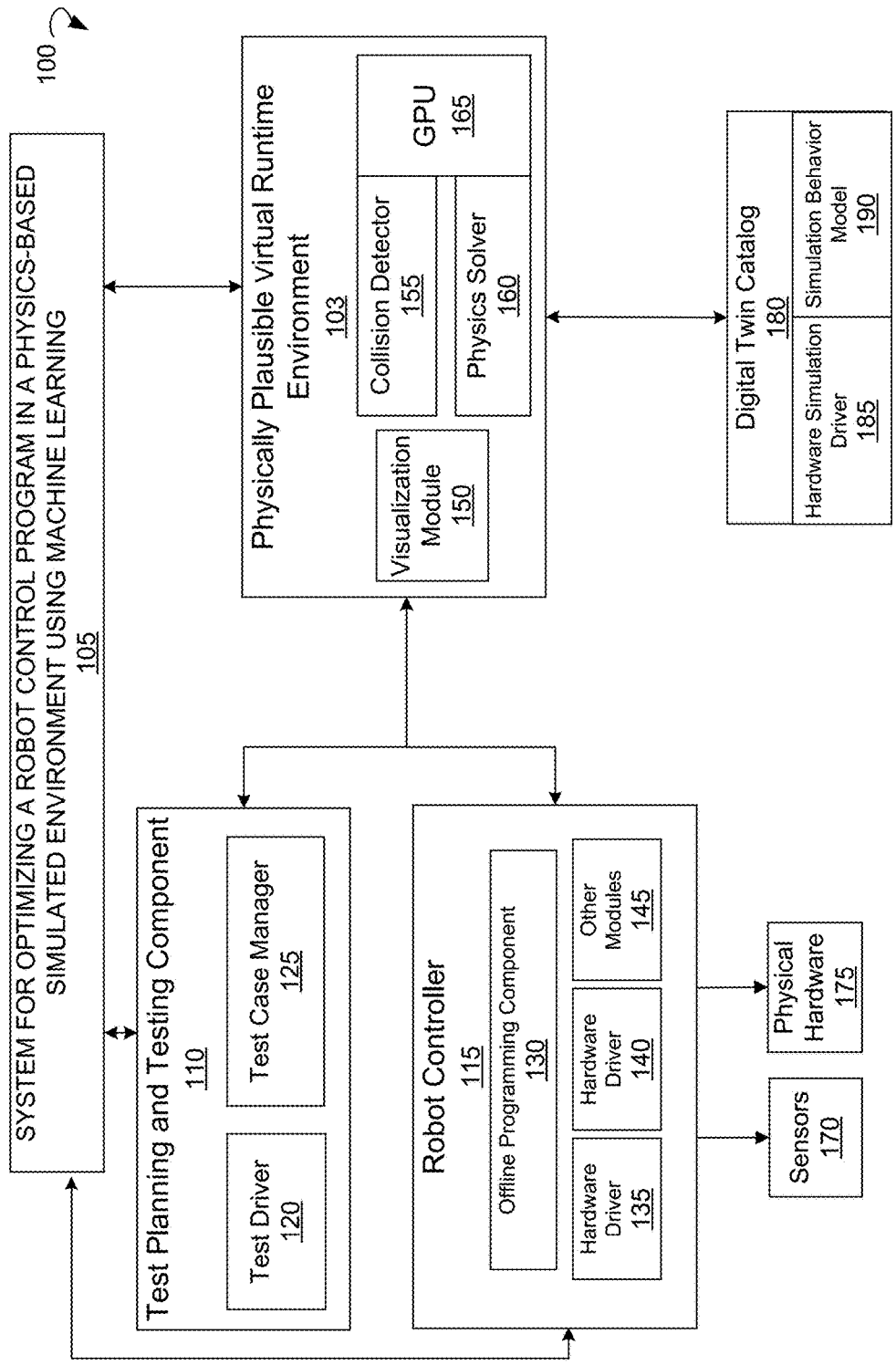
FIG. 1 shows an example environment, within which methods and systems for optimizing a robot control program in a physics-based simulated environment using machine learning can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The present disclosure relates to methods and systems for optimizing a robot control program in a physics-based simulated environment using machine learning. More specifically, a continuous process of automatic development, debugging, and deployment of robot control programs and test patterns in the physics-based simulated environment is described. This process is supported by a Hardware-in-the-Loop (HWIL) simulation framework, tools, and sensors operating in a real-time virtual 3-dimentional (3D) environment.

In general, the method for optimizing a robot control program in a physics-based simulated environment of the present disclosure involves program planning software to generate multiple variations of task execution and optimize parameters for the robot control programs based on results of the task execution. The method may allow for an unsupervised task planning using machine learning.

The method further involves running a physically plausible virtual runtime environment for robotic software applications, i.e. for a simulated robot. The physically plausible virtual runtime environment is a tool that can substitute real working environments for the robotic software applications. More specifically, the physically plausible virtual runtime environment, on one hand, generates relevant sensor data (e.g., visual, tactile) and, on the other hand, computes the consequences of actions (e.g., actuator movements, object manipulation) a simulated robot undertakes. Therefore, the physically plausible virtual runtime environment enables the closed-loop operation of perception, reasoning and action sequences that are the basic building blocks of any robotic software application on top of a virtual reality.

More specifically, according to an example embodiment of the present disclosure, multiple virtual test cases may be generated for a robotic task to be performed by a physical robot. A control strategy for executing the virtual test cases in the physically plausible virtual runtime environment may be determined. In the course of execution of multiple virtual test cases, also referred to herein as test execution, in the physically plausible virtual runtime environment, a success of the execution of each of the multiple virtual test cases can be measured. The measurements of success of the execution may be stored to a historical database. More specifically, the historical database may be populated with a plurality of sets of training and validation data obtained from execution of each of the virtual test cases. The training and validation data may be used to train a machine learning algorithm. Specifically, the results of test execution may be analyzed using machine learning algorithms. The machine learning algorithms may include artificial neural networks. An artificial neural network may include a computational model, which is based on a collection of neural units built according to an organizing and functioning principle of biological neural networks. The artificial neural network can be self-learning and training. During the training, the artificial neural network may reveal dependencies between input data and output data and may generalize results.

Multiple virtual test cases may be continuously executed while using the machine learning algorithm to adjust parameters of the control strategy until parameters of the virtual test cases are optimized based on the results of tests and optimal test cases are determined. More specifically, a feedback loop can use the parameters of the control strategy for the virtual test cases from the historical database to train the machine learning algorithm using the training and validation data. In other words, sets of training and validation data may be used in the execution of virtual test cases for different control strategies. Thus, the physically plausible virtual runtime environment is used to generate training and variation data and reproduce individual training scenarios from the generated training and variation data. The training and validation data may include the training and validation data obtained from previous executions of the virtual test cases and training and validation data generated specifically for the current virtual test case.

The analysis of the results of test execution may include determining how close the result is with respect to the successful execution of the task by assigning scores to the results of test execution. The parameters of the control strategy and the scores may be provided to the artificial neural network. The artificial neural network may adjust the parameters based on the scores to optimize the parameters of the virtual test cases. The virtual test cases may be further executed using the optimized parameters and results that are closer to the successful execution of the task may be obtained. The parameters of the control strategy may be continuously adjusted by the artificial neural network and the virtual test cases may be continuously executed with the adjusted parameters until it is determined, based on the scores, that the successful execution of the task is achieved. The parameters with which the successful execution of the task is achieved may be considered to be optimal parameters for the virtual test case. In other words, the artificial neural network may be trained with the continuously adjusted parameters of the control strategy and scores and may select the optimal parameters for the virtual test cases. The virtual test cases with the optimal parameters may be provided for execution by the physical robot. Additionally, upon execution of the virtual test cases by the physical robot, real training and validation data associated with the execution of the virtual test case by the physical robot may be received. The real training and validation data may be used to additionally adapt the artificial neural network. By using the artificial neural network adapted based on the real training and validation data, a further optimal test case may be provided. The further optimal test may have a higher score related to the success of the execution than the score of the optimal test case obtained by executing the virtual test cases.

In an example embodiment, thousand rounds of simulations, i.e. thousand rounds of execution of the virtual test cases, may be performed in the physics-based simulated environment to train the artificial neural network. Upon determining the optimal test case using the vertical test cases, several dozens of execution of the optimal test case on the physical robot may be performed. A feedback obtained based on the execution of the optimal test case on the physical robot, i.e. real training and validation data, may be used to further optimize the test case. The further optimal test may be stored to the historical database. In some example embodiments, scores related to the real training and validation data obtained using the physical robot may have higher weights that scores related to the training and validation data obtained using the simulated robot.

The virtual runtime environment may include a Graphics Processing Unit (GPU)-based collision detector to compute contacts between complex 3D geometries and a mechanical simulation framework to provide plausible mechanical behavior based on Newtonian physics. Moreover, a HWIL approach can be employed for interfacing robot control hardware and/or algorithms with the virtual runtime environment.

The method of the present disclosure is performed using a GPU-based collision and finite element method (FEM)-computing algorithms that allow real-time capable simulation of rigid-body and soft-body physical objects, a test framework for automated tests of robot control programs and algorithms running and recording user-defined test cases, and a HWIL integration of real control hardware or algorithms. The real-time capable simulation of rigid-body and soft-body physical objects may be augmented with soft-body dynamics, skeleton-muscle systems, and simplified FEM models.

Referring now to the drawings, FIG. 1 illustrates an environment 100 within which methods and systems for optimizing a robot control program in a physics-based simulated environment using machine learning can be implemented. The environment 100 may include a system 105 for optimizing a robot control program in a physics-based simulated environment using machine learning. The system 105 may include a physically plausible virtual runtime environment 103, a test planning and testing component 110, and a robot controller 115. The physically plausible virtual runtime environment 103 can be used to simulate a real environment for the simulated robot.

The test planning and testing component 110 may include a test driver 120 and a test case manager 125. The test driver 120 may be operable to provide coordination of the robot controller 115 and events occurring during the execution of tests. The test case manager 125 may be operable to create test criteria, archive robot control programs associated with test cases, archive results of execution of tests, archive events occurring during the execution of tests, and the like. The test planning and testing component 110 may be operable to define a robotic task. Based on the robotic task, the test planning and testing component 110 may generate a plurality of virtual test cases associated with the tests for the robotic task. In an example embodiment, generating of the plurality of virtual test cases may include determining the physically plausible virtual runtime environment for a simulated robot.

The test planning and testing component 110 may be further operable to determine a control strategy for executing the plurality of virtual test cases and initial parameters for the control strategy. The test planning and testing component 110 may be further operable to create the physics-based simulated environment.

In an example embodiment, creating the physics-based simulated environment may include generating sensory inputs for the physically plausible virtual runtime environment. The machine learning algorithm may be used to map the sensory inputs to commands for the simulated robot to carry out in order to perform the robotic task. Additionally, physical forces exerted by the simulated robot on a simulated object may be simulated and reaction forces of the simulated object, on which the physical forces are inserted, may be determined. Mass distribution of the simulated object may be taken into consideration.

The robot controller 115 may include an offline programming component 130, a plurality of hardware drivers shown as a hardware driver 135 and a hardware driver 140, and other modules 145. The robot controller 115 may be connected with a physical hardware 175 (such as a physical robot). The robot controller 115 may be further operable to execute the plurality of virtual test cases in parallel in the physics-based simulated environment on the simulated robot. The robot controller 115 may be connected to a sensor 170 to sense parameters associated with the simulated robot during the execution of the virtual test cases. The virtual test cases may be executed based on the control strategy. Upon obtaining results of the execution, the robot controller 115 may analyze the results of the execution of the virtual test cases and measure a success of the execution of each of the plurality of virtual test cases. In an example embodiment, the measuring of the success of the execution of a virtual test case may be indicative of a success of performing the robotic task.

The robot controller 115 may store measurements of success of the execution of the plurality of virtual test cases to a historical database as training and validation data. The measurement the success of the execution of the plurality of virtual test cases may be based on a degree of success of completing the robotic task. The robot controller 115 may further train a machine learning algorithm, such as artificial neural networks, using the training and validation data. The training and validation data may include sets of inputs and corresponding desired outputs from the historical database. The robot controller 115 may continuously execute the plurality of virtual test cases while using the machine learning algorithm to adjust parameters of the control strategy until one or more optimal test cases are determined. Each set of the training and validation data obtained from each run of the execution of the plurality of virtual test cases may be ranked based on the success of the execution. The runs of the execution of the plurality of virtual test cases may be associated with different situations that a physical robot can encounter, e.g. different kinds of graspable objects under varying environmental conditions.

The robot controller 115 may be further configured to execute the one or more optimal test cases on the physical robot. The robot controller 115 may measure a success of the execution for each of the one or more optimal test cases on the physical robot in view of the robotic task. In an example embodiment, the plurality of virtual test cases for the robotic task may correspond to different plausible situations associated with the physical robot. Based on the measurements of success, the robot controller 115 may select at least one optimal test case from the one or more optimal test cases. The plausible situations may include behavioral variations by which the simulated robot explores a space of possible states in order to find an optimal policy to execute the robotic task.

In an example embodiment, the physically plausible virtual runtime environment 103 may include a GPU 165. A GPU-based collision detection mechanism may be implemented by a collision detector 155 and a physics solver 160. In an example embodiment, the GPU-based collision detection mechanism may be used during the analysis of the results of the execution of the virtual test cases. The collision detector 155 may be used to compute contacts between at least two 3D geometries in real time. The detection of contacts between two 3D geometries can include detection of collisions between objects with complex 3D geometries in real-time. The physics solver 160 may be operable to determine contact forces and impulses, analyze kinematics and material behavior (e.g., deformation), and so forth.

The GPU-based collision detection mechanism may be used to employ General Purpose Graphics Processing Unit (GPGPU) hardware to check Computer-Aided Design (CAD)-constructed 3D geometries for possible contacts. Additionally, the GPU-based collision detection mechanism may be used to employ a hybrid bounding volume hierarchy and a spatial hashing approach to allow for a high degree of parallelized processing. In a further example embodiment, the GPU-based collision detection mechanism may be used to employ a hybrid geometry data representation that combines both polygonal surface descriptions and a compressed point cloud data format to enable an operation of both spatial hashing and geometry feature-based intersection computation approaches. The GPU-based collision detection mechanism may be optimized for virtual environments with a high number of possibly intersecting, moving concave triangle meshes and with both the geometric data representation and scheduling strategies being employed for planning and executing intersection checks.

The physically plausible virtual runtime environment 103 may further include a FEM-based mechanism for virtual prototyping of rigid-body physical objects and soft-body physical objects in real time. Additionally, the physically plausible virtual runtime environment 103 may include a mechanical simulation framework for providing plausible mechanical behavior based on Newtonian physics.

In a further example embodiment, the physically plausible virtual runtime environment 103 may include a HWIL simulation framework. The HWIL simulation framework may be configured to interface between the robot controller 115 and the physically plausible virtual runtime environment 103. More specifically, a physical robot and a robot environment may be simulated and controlled by connecting the control hardware or control algorithms of the physical robot to a virtual model provided by the physically plausible virtual runtime environment 103.

The physically plausible virtual runtime environment 103 may be connected to a digital twin catalog 180. The digital twin catalog 180 may have a hardware simulation driver 185 and a simulation behavior model 190. The digital twin catalog 180 may store data associated with digital twins. The digital twins may include environment objects and controlled objects. Based on a type of the task and the purpose of the task, a plurality of environment objects (also referred to as "objects") associated with the test may be recognized (i.e., physical objects, such as a glass to be gripped by the simulated robot according to the test). Information associated with the objects may be stored in the digital twin catalog 180, such as object types, object parameters, and object properties. The object properties may include a viscosity, a mass, a rigidity, a fragility, a shape, a physical behavior, and so forth. Furthermore, the object parameters stored in the digital twin catalog 180 may include a CAD-model for visual modelling of the object, collision geometry for calculating geometry of collision and force handling, elastic behavior for further planning of motion and force control (e.g., when gripping a deformable object), kinematics for determining degrees of freedom (e.g., joint limits, friction properties for calculating demanded force to hold an object), a FEM-based model (e.g., a tetrahedron-based model) for simulation of deformation (material properties like deformation structure may be needed for this model), multiple phases materials for determining two phase (e.g., skin and on bones), maximum force before braking, a weight per measurement unit for calculating the weight of the whole object, and further physical behavior models.

The controlled objects may include simulated robots or parts of simulated robots (e.g., grippers). The information associated the simulated robots and stored in the digital twin catalog 180 may include Application Program Interface-to-controller parameters used to control a digital twin with a physical controller or a virtualized controller.

Additionally, the physically plausible virtual runtime environment 103 may include a software framework. The software framework may be applicable for testing and optimizing robot control programs based on data computed in the physically plausible virtual runtime environment or provided to the physically plausible virtual runtime environment. In an example embodiment, the optimization may include minimizing execution time or movement distances during the execution of the virtual test cases.

The physically plausible virtual runtime environment 103 may further include a visualization module 150 for visualizing the simulated robot during the execution of plausible tests.

In an example embodiment, the system 105 may further include a database (not shown), also referred to herein as a historical database. The database may be operable to store data associated with indexing, searching, and retrieval architecture for geometric modelling robots, tools, workpieces, working environments, mechanical and material properties of objects, kinematics, mechatronic properties and behavior models of robots, mechatronic properties and behavior models of actuators, sensors, template building blocks for trajectories, motion plans, object recognition, handling and manipulation tasks, patterns and a framework supporting decision making Artificial Intelligence software, and so forth.

In a further example embodiment, the system 105 may further include a robot, i.e. a physical robot (not shown). The robot may be operable to execute one or more optimal test cases upon running the robotic task on the robot controller.

The system 105 provides a virtual commissioning of the physical robot by supporting developers and engineers during design, implementation, and testing phases for industrial assembly facilities (such as physical robots) using virtual reality technology. Physics-based robot simulation operations are used to test tasks on the simulated robot before the physical robot is available and installed. Design and test modifications can be provided to existing processes associated with physical robots by preparing and testing changes to existing processes and robot control programs implementing them without having to stop production operations associated with the physical robots. Moreover, a post-mortem analysis may be performed for the physical robots via simulation by reproducing failures, which occurred in assembly lines of the physical robots.

Furthermore, the system 105 may provide a virtual training environment to teach and train engineers, software developers, and workers to operate robots and equipment associated with the robots before actually using physical robots. Ergonomics and reliability studies may be provided for worker assistance systems by simulation of tools and devices (e.g., robot arms amplifying strength of a human worker during abrasive work-piece machining) and interaction of the tools and devices with a simulated model of the human skeleton-muscle apparatus.

Additionally, a human-robot collaboration can be provided by safety analysis and risk assessment for tasks that require human workers and robotic equipment to work together in close proximity. Moreover, the system 105 can provide a learning process for optimization of robot behavior and task results in service and industrial robotics.

Figure 2:
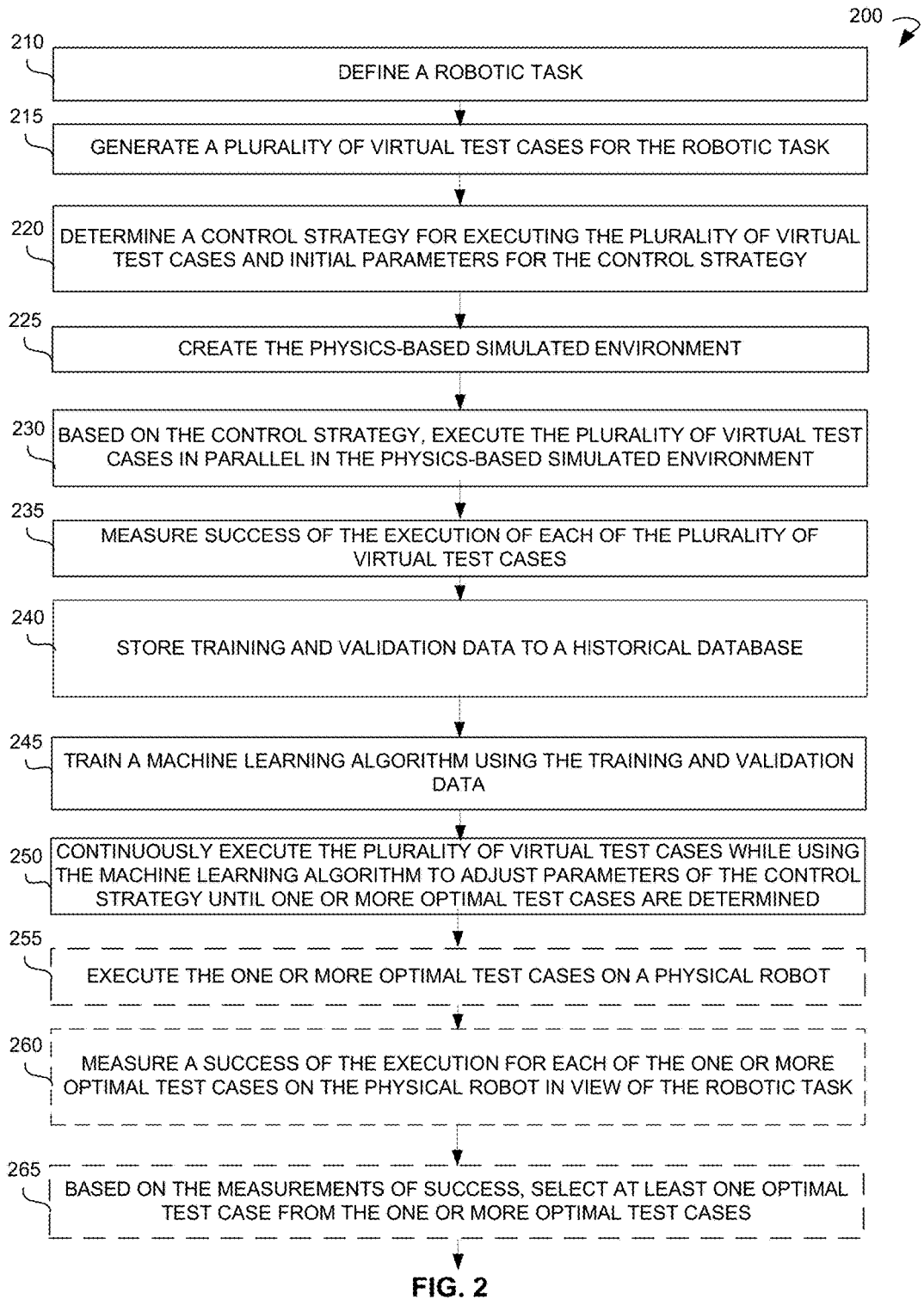
FIG. 2 is a process flow diagram of a method for optimizing a robot control program in a physics-based simulated environment using machine learning, according to an example embodiment.

FIG. 2 is a process flow diagram of a method 200 for optimizing a robot control program in a physics-based simulated environment using machine learning, according to an example embodiment. The method 200 may commence with defining a robotic task at operation 210. In an example embodiment, task data associated with the robotic task may be obtained from a database, such as a historical database. The task data may be indicative of at least one part, e.g., one or more test cases, of at least one robot control program to be tested. In an example embodiment, the task data may include a gripping process and a combination of a plurality of subtasks. Additionally, the task data may include user-defined result criteria. In an example embodiment, the method 200 may further include providing a human-machine interface (HMI) operable to receive the robotic task. The HMI may be further operable to receive commands using at least one of the following: a text, a voice, and a gesture.

The method 200 may continue with generating a plurality of virtual test cases for the robotic task at operation 215. In an example embodiment, the plurality of virtual test cases for the robotic task correspond to different plausible situations associated with the physical robot. The plausible situations may include behavioral variations by which a simulated robot explores a space of possible states in order to find an optimal policy to execute the robotic task.

The plurality of virtual test cases may be designed to execute at least one task associated with the task data. The at least one task for the plurality of virtual test cases may be automatically selected based on a description of the at least one task in the task data. In other words, the task for the virtual test case associated with the robot control program can be retrieved from the database based on a description of a result that the virtual test case associated with the robot control program needs to achieve when executed on the simulated robot.

Additionally, a description of the working environment of a physical robot may be obtained from the database. Therefore, a task for the virtual test case associated with the robot control program retrieved from the database can be automatically adjusted to the working environment based on the description of the working environment.

In an example embodiment, the plurality of virtual test cases may include at least one of the following: tests of the same scenario for different control programs, tests of different scenarios for the same control program, tests of the same scenario with different test parameters for the same control program, and so forth.

The generation of the plurality of virtual test cases may include determining a physically plausible virtual runtime environment for a simulated robot and creating a plurality of plausible tests for the control strategy. The plurality of plausible tests may be designed to execute the robotic task.

At operation 220, a control strategy for executing the plurality of virtual test cases and initial parameters for the control strategy may be determined. The method 200 may further include creating the physics-based simulated environment at operation 225. In an example embodiment, creation of the physics-based simulated environment may include generating sensory inputs for the physically plausible virtual runtime environment. In an example embodiment, the sensory inputs may include at least one of the following: an electrical emulation of a sensor, an electrical emulation of an actuator, visual data, tactile data, ambient data, visual feedback of an execution of the virtual test cases and optimal test cases on the simulated robot, and the like.

The machine learning algorithm may be used to map the sensory inputs to commands for the simulated robot to carry out in order to perform the robotic task. The creation of the physics-based simulated environment may further include determining physical forces exerted by the simulated robot and reaction forces of an object on which the physical forces are inserted are simulated.

In some embodiments, the determining of the physics-based simulated environment of the simulated robot is performed by recognizing at least one object associated with the simulated robot and classifying the at least one object based on data received from a digital twin catalog. The classification may be based on at least one of the following properties of the at least one object: a viscosity, a mass, a rigidity, a fragility, a shape, a physical behavior, a kinematical behavior, and so forth.

Additionally, based on the classification, further data concerning the at least one object may be obtained. Specifically, the further data may be obtained from metadata of a digital twin associated with the at least one object. The physics-based simulated environment of the simulated robot may be generated based on the metadata of the digital twin.

At operation 230, the plurality of virtual test cases in parallel in the physics-based simulated environment may be executed based on the control strategy. The method 200 may continue with measuring a success of the execution of each of the plurality of virtual test cases at operation 235. The measure of success may be indicative of a success of performing the robotic task.

The method 200 may further include storing training and validation data to a historical database at operation 240. The training and validation data may include at least measurements of success of the execution of the plurality of virtual test cases. The training and validation data may include sets of inputs and corresponding desired outputs from the historical database.

The method 200 may continue with training a machine learning algorithm using the training and validation data at operation 245. At operation 250, the plurality of virtual test cases may be continuously executed while using the machine learning algorithm to adjust parameters of the control strategy until one or more optimal test cases are determined.

The results of the execution may be continuously analyzed, i.e. a success of the execution of each of the plurality of virtual test may be continuously measured, to adjust parameters of the control strategy. In an example embodiment, the method 200 may further include defining passing criteria (i.e. a "correct result") for the plurality of virtual test cases. The results of the execution may be compared to the passing criteria. In this embodiment, the selection of the optimal test cases may be based on whether the passing criteria are satisfied.

The virtual test cases may be associated with sub-parts of the robot control programs. Therefore, the correctness of sub-parts of the robot control programs can be determined automatically based on the passing criteria. In further example embodiments, the virtual test cases may be associated with the entire robot control program. Therefore, the passing criteria that are required to be met for a correct or desired result of the robot control program may be defined. Thus, the error-free execution of the entire robot control program can be determined. Additionally, one or more predetermined actions may be triggered based on the results of the execution of the plurality of plausible tests.

In an example embodiment, the analysis of the results of the execution may include collision detection by computing contacts between complex 3D geometries in real time. During the collision detection, contact forces and impulses may be determined, kinematics and material behavior may be analyzed. The collision detection is described in detail with reference to FIG. 3.

In an example embodiment, the method 200 may further include executing the one or more optimal test cases on a physical robot at operation 255. At operation 260, a success of the execution for each of the one or more optimal test cases on the physical robot in view of the robotic task may be measured. Based on the measurements of success, at least one optimal test case may be selected from the one or more optimal test cases at operation 265.

Figure 3:
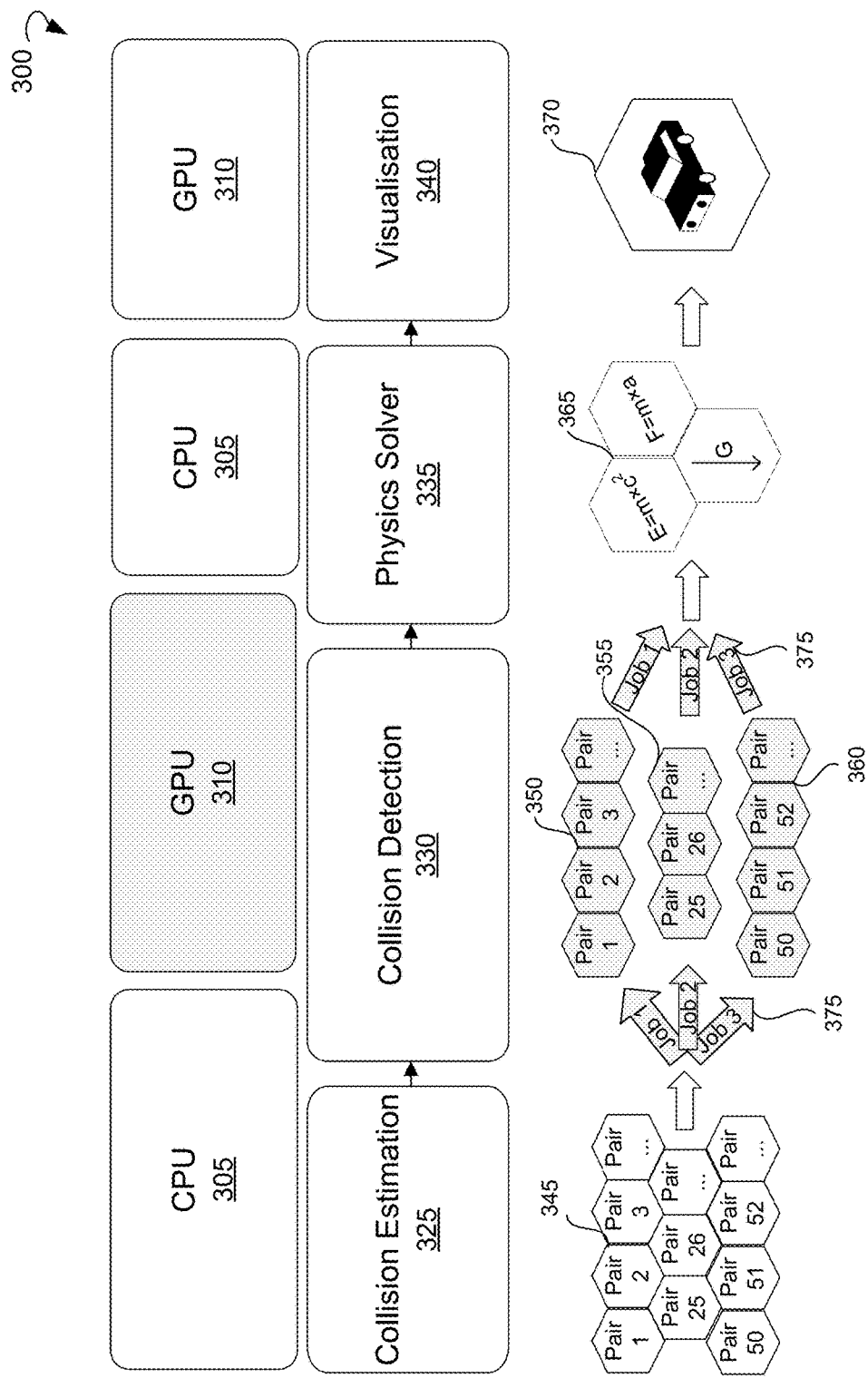
FIG. 3 is a block diagram showing a collision detection process, according to an example embodiment.

FIG. 3 is a block diagram 300 showing a collision detection process, according to an example embodiment. A central processing unit (CPU) 305 may perform collision estimation at step 325. The step 325 may be performed for a plurality of collision pairs 345. A collision pair may include two 3D objects that collide during the execution of the test. At step 330, the GPU 310 may perform collision detection. The collision detection may be run in parallel queues on a plurality of cores associated with the GPU 310. More specifically, the collision detection may be divided into a plurality of jobs 375. Each job 375 may be associated with collision pairs (shown as collision pairs 350, 355, and 360) and may be directed to a separate core. The cores may further direct data associated with the collision pairs 350, 355, and 360 to the CPU 305 for performing the step 335 of solving physics problems associated with collisions (contact forces, impulses, kinematics, and so forth) using Newtonian physics principles 365. The CPU 305 may provide the processed data to the GPU 310 for visualizing results 370 at step 340.

In some embodiments, the results of execution of the virtual test cases may be classified into categories. The categories may include at least one of the following: a success, a fail, a partial success, a near success, and so forth. The success may be based on meeting at least one of the following criteria: spatial, temporal, and logical. During the optimization, a category associated with the virtual test case may be determined and the virtual test case may be optimized based on this category. The execution of the optimized test case on the simulated robot may include an actuator movement, an object manipulation, and so forth.

Figure 4:
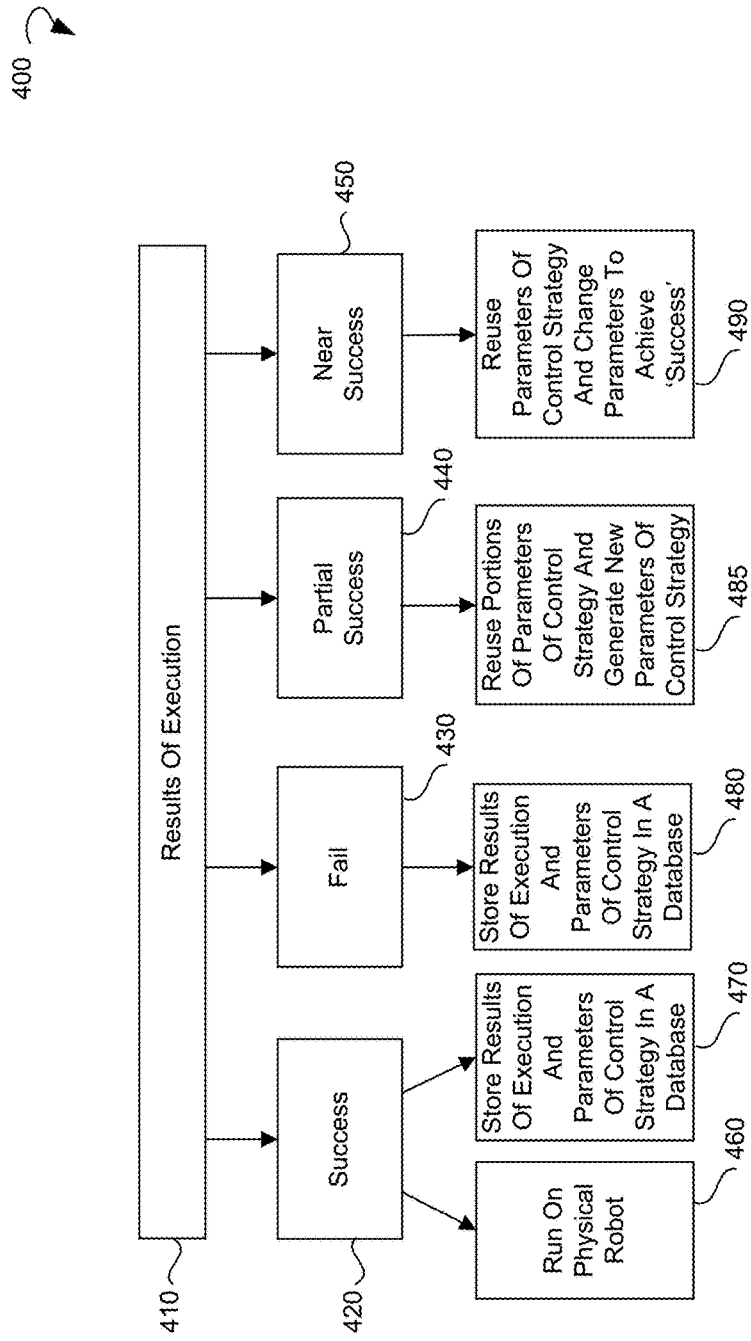
FIG. 4 is a block diagram showing actions performed based on results of execution of virtual test cases, according to an example embodiment.

FIG. 4 is a block diagram 400 showing actions performed based on the results of execution of virtual test cases, according to an example embodiment. The virtual test cases may be executed and results of execution 410 may include a success result 420, a fail result 430, a partial success result 440, and a near success result 450.

In case of the success result 420, a step 460 may be performed by running the virtual test case associated with the success result 420 on a physical robot. Moreover, the results of execution determined to be 'success' and parameters of the control strategy with the virtual test case that resulted in the 'success' results of the execution may be stored to a database at step 470.

In case of the fail result 430, the results of execution determined to be 'fail' and parameters of the control strategy associated with the virtual test case that resulted in the 'fail' results of execution may be stored to the database at step 480. The data associated with the 'fail' results may be used to understand why the parameters of the control strategy did not work.

In case of the partial success result 440, the portions of parameters of the control strategy associated with the virtual test case that resulted in the 'partial success' results of execution may be reused to generate new parameters of the of the control strategy at step 485. For example, the partial success result 430 may show that the simulated robot can reach and pick an object used in a test but the place of the object may need to be re-planned.

In case of the near success result 450, the parameters of the control strategy associated with virtual test case that resulted in the 'near success' results of execution may be reused and some parameters of the control strategy may be adjusted at step 490 to achieve 'success' results of execution.

Figure 5:
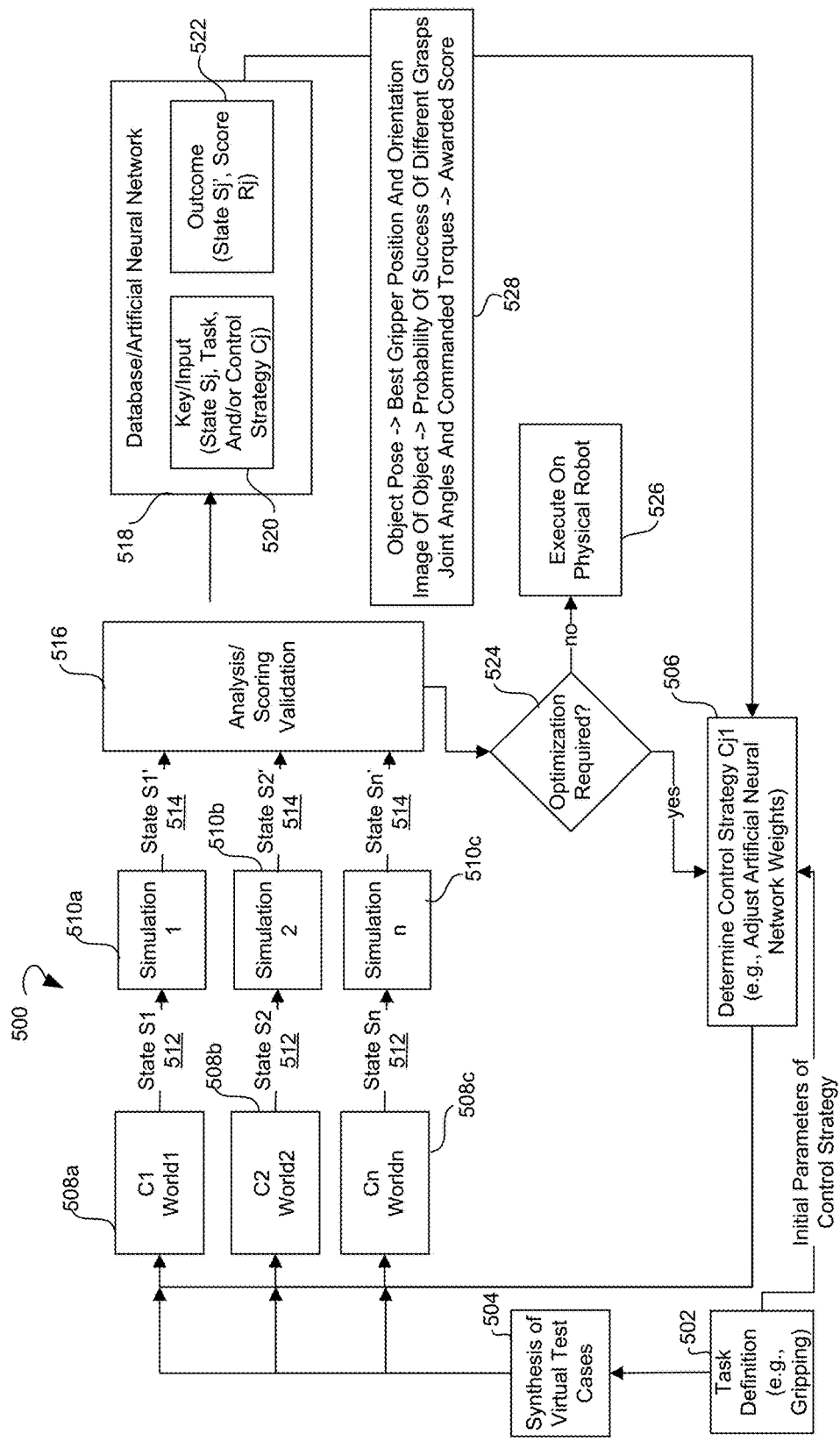
FIG. 5 is a block diagram of an example method for optimizing a robot control program in a physics-based simulated environment using machine learning, according to an example embodiment.

FIG. 5 is a block diagram showing an example method 500 for optimizing a robot control program in a physics-based simulated environment using machine learning, according to an example embodiment. The method 500 may commence with task definition when a robotic task (e.g., gripping) is defined at block 502. Multiple possibilities may be available for receiving commands associated with the robotic task from the HMI, such as voice recognition, an HMI tablet, gesture recognition, and so forth. The task data, such as the purpose or definition of the robotic task and task type can be entered as a command by voice, text (e.g., via keyboard), or gestures. The task type may include a gripping process, or a complex task including a combination of multiple subtasks, for example "bring me a drink". The task type may have abstract or precise success criteria, which may include special, temporal, logical, and other parameters.

At block 504, the synthesis of virtual test cases can be performed, in particular, a plurality of virtual test cases for the robotic task can be generated. At block 506, a control strategy for executing the plurality of virtual test cases and initial parameters for the control strategy may be determined. The control strategy may be associated with a robot control program to be optimized using the method 500. For example, artificial neural network weights associated with the control strategy, actions of the robot, e.g. grasping, searching, and the like, may be determined based on predetermined optimization algorithms. Determining the control strategy may include determining initial parameters of the control strategy based on the task definition.

At blocks 508a, 508b, 508c and 510a, 510b, 510c, the plurality of virtual test cases may be executed in parallel in the physics-based simulated environment based on the parameters for the control strategy. More specifically, at blocks 508a, 508b, and 508c, the parameters of the control strategy may be provided to the physics-based simulated environment. In an example embodiment, the parameters may be provided in a form of world coordinates. Blocks 508a and 510a may relate to simulation of virtual test cases of one variant of the control strategy, while blocks 508b and 510b may relate to simulation of virtual test cases of another variant of the control strategy, and blocks 508c and 510c may relate to simulation of virtual test cases of one another variant of the control strategy. States 512 shown as state S1, state S2, and state Sn are provided to blocks 510a, 510b, and 510c, at which the simulation of the robotic task in the physics-based simulated environment may be performed using the artificial neural network. States 514 shown as state S1', state S2', and state Sn' may be provided to block 516. States 512 and 514 may be the results of execution of the virtual test cases.

Specifically, based on the task definition and the control strategy, an object associated with the virtual test case may be recognized and the object type may be classified based on a digital twin catalog. Classification may be based on properties like viscosity, mass, rigidity, fragility, shape, physical and kinematical behavior, and so forth. After classifying the object type, further information concerning the object may be obtained from metadata associated with a digital twin of the object. Based on the metadata associated with the digital twin, a simulation environment may be simulated for the object.

At block 516, the analysis, scoring and/or validation of the results of execution may be performed. In an example embodiment, the parameters of the analysis, scoring, and validation may include a success of the results of execution, performance, fastest result, sub-task success, and so forth. Criteria for results of execution of tests may be defined with reference to events/actions for handling the results of execution. The results of execution can be categorized based on physics and behavior simulation. The results of execution can be obtained as stimuli from the simulated environment, which may be set by the parameters of the control strategy and changed by the interaction with the stimulated robot. The stimuli can include contact signals (e.g., glass achieved the final position), events signals (e.g., glass gets full with water), occurrence of an unexpected event (glass slips or falls down because of a gripper; glass is broken because of structure parameters in case of high force).

The analysis may include measuring a success of the execution of each of the plurality of virtual test cases. The measurements of success of the execution of the plurality of virtual test cases may be stored to a database and provided to the artificial neural network in a form of training and validation data at block 518. Additionally, events occurring during the execution of the virtual test cases may be logged in the database. More specifically, the database may store key/input 520. The key/input 520 may include states 508a, 508b, and 508c, tasks, and the control strategy. The database may further store outcome 522. The outcome 522 may include states 510a, 510b, and 510c, and scores obtained at block 516. All key/inputs 520 and outcomes 522 may be provided to the artificial neural network to train the artificial neural network. The training and validation data may be provided from the database to block 506 to adjust the control strategy.

Upon the analysis performed at block 516, the training and validation data may be provided to block 524 to determine whether optimization of parameters of the control strategy are required to obtain optimal test cases. When it is determined that the optimal test case is already obtained and no optimization of parameters of the control strategy is needed, the optimal test case may be executed on a physical robot at block 526. When it is determined that the optimization of parameters of the control strategy is needed, the training and validation data may be provided to block 506 to adjust the parameters of the control strategy. The adjusted parameters of the control strategy may be provided to the physics-based simulated environment at blocks 508a, 508b, 508c, and the simulation of the robotic task using the adjusted parameters may be performed at blocks 510a, 510b, and 510c using the artificial neural network. Therefore, the artificial neural network may be continuously trained by providing the input, i.e. the training and validation data, to the artificial neural network and receiving the output, i.e. adjusted parameters, from the artificial neural network determined based on predetermined functions, formulas, and algorithms.

Block 528 shows an example problem that can be solved using the artificial neural network that was trained with the training and validation data. The task related to an object pose associated with an image may be performed to determine the best gripper position and orientation, i.e. whether the object is graspable and where in particular the object is graspable. Upon receiving an input in a form of an image of an object, the artificial neural network that was trained on a plurality of sets of training and validation data may determine the probability of success of different grasps. The artificial neural network may provide an output in a form of classifications of different grasping angles, e.g., joint angles and commanded torques, and different grasping positions each awarded with a score to determine whether the object is graspable or not graspable.

Figure 6:
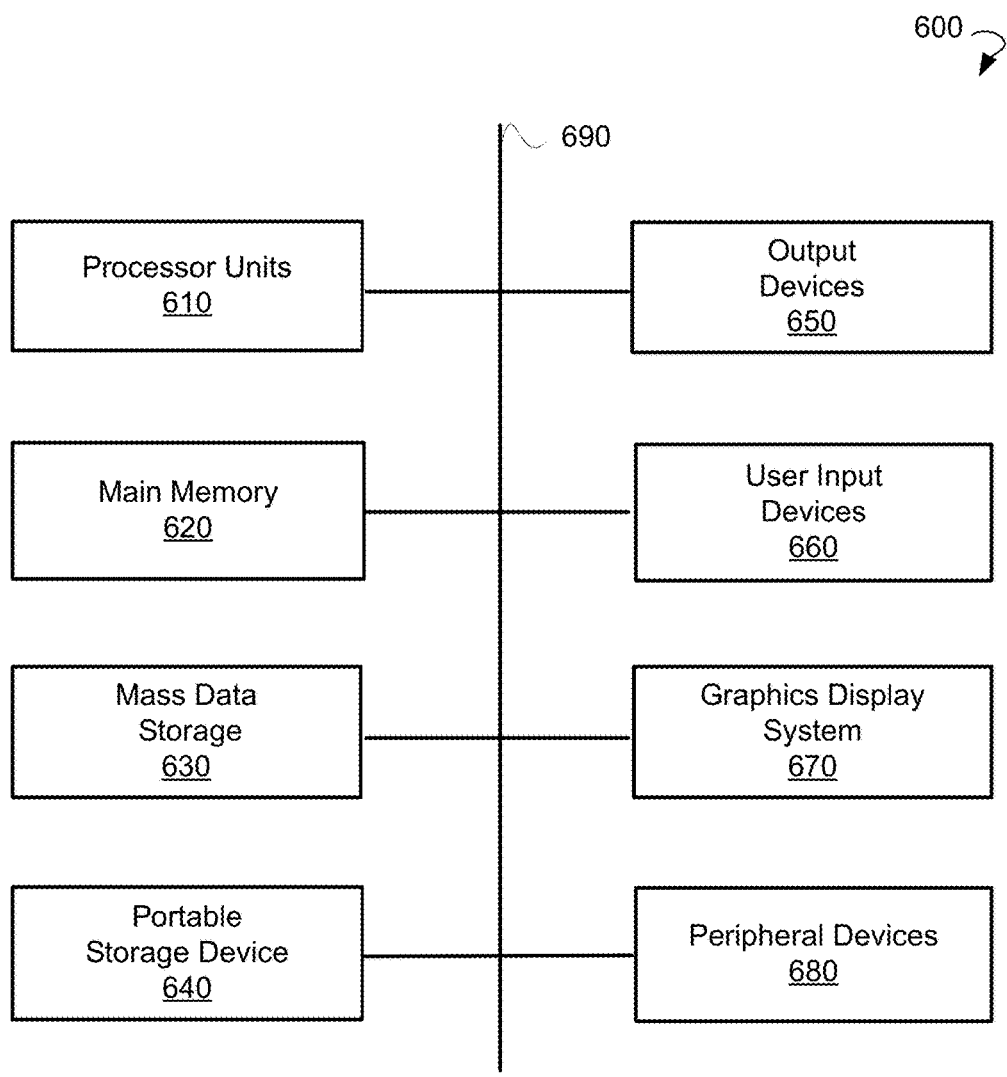
FIG. 6 is a diagrammatic representation of a computing device for a machine, within which a set of instructions for causing the machine to perform any one or more of the methodologies discussed herein can be executed.

FIG. 6 illustrates a computer system 600 that may be used to implement embodiments of the present disclosure, according to an example embodiment. The computer system 600 may serve as a computing device for a machine, within which a set of instructions for causing the machine to perform any one or more of the methodologies discussed herein can be executed. The computer system 600 can be implemented in the contexts of the likes of computing systems, networks, servers, or combinations thereof. The computer system 600 includes one or more processor units 610 and main memory 620. Main memory 620 stores, in part, instructions and data for execution by processor units 610. Main memory 620 stores the executable code when in operation. The computer system 600 further includes a mass data storage 630, a portable storage device 640, output devices 650, user input devices 660, a graphics display system 670, and peripheral devices 680. The methods may be implemented in software that is cloud-based.

The components shown in FIG. 6 are depicted as being connected via a single bus 690. The components may be connected through one or more data transport means. Processor units 610 and main memory 620 are connected via a local microprocessor bus, and mass data storage 630, peripheral devices 680, the portable storage device 640, and graphics display system 670 are connected via one or more input/output buses.

Mass data storage 630, which can be implemented with a magnetic disk drive, solid state drive, or an optical disk drive, is a non-volatile storage device for storing data and instructions for use by processor units 610. Mass data storage 630 stores the system software for implementing embodiments of the present disclosure for purposes of loading that software into main memory 620.

The portable storage device 640 may operate in conjunction with a portable non-volatile storage medium, such as a floppy disk, a compact disk, a Digital Versatile Disc (DVD), or a Universal Serial Bus storage device, to input and output data and code to and from the computer system 600. The system software for implementing embodiments of the present disclosure is stored on such a portable medium and input to the computer system 600 via the portable storage device 640.

User input devices 660 may provide a portion of a user interface. User input devices 660 include one or more microphones; an alphanumeric keypad, such as a keyboard, for inputting alphanumeric and other information; or a pointing device, such as a mouse, a trackball, stylus, or cursor direction keys. User input devices 660 can also include a touchscreen. Additionally, the computer system 600 includes output devices 650. Suitable output devices include speakers, printers, network interfaces, and monitors.

Graphics display system 670 may include a liquid crystal display or other suitable display device. Graphics display system 670 may receive textual and graphical information and processes the information for output to the display device. Peripheral devices 680 may include any type of computer support device to add additional functionality to the computer system.

The components provided in the computer system 600 of FIG. 6 may include those typically found in computer systems that may be suitable for use with embodiments of the present disclosure and are intended to represent a broad category of such computer components that are well known in the art. Thus, the computer system 600 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 7:
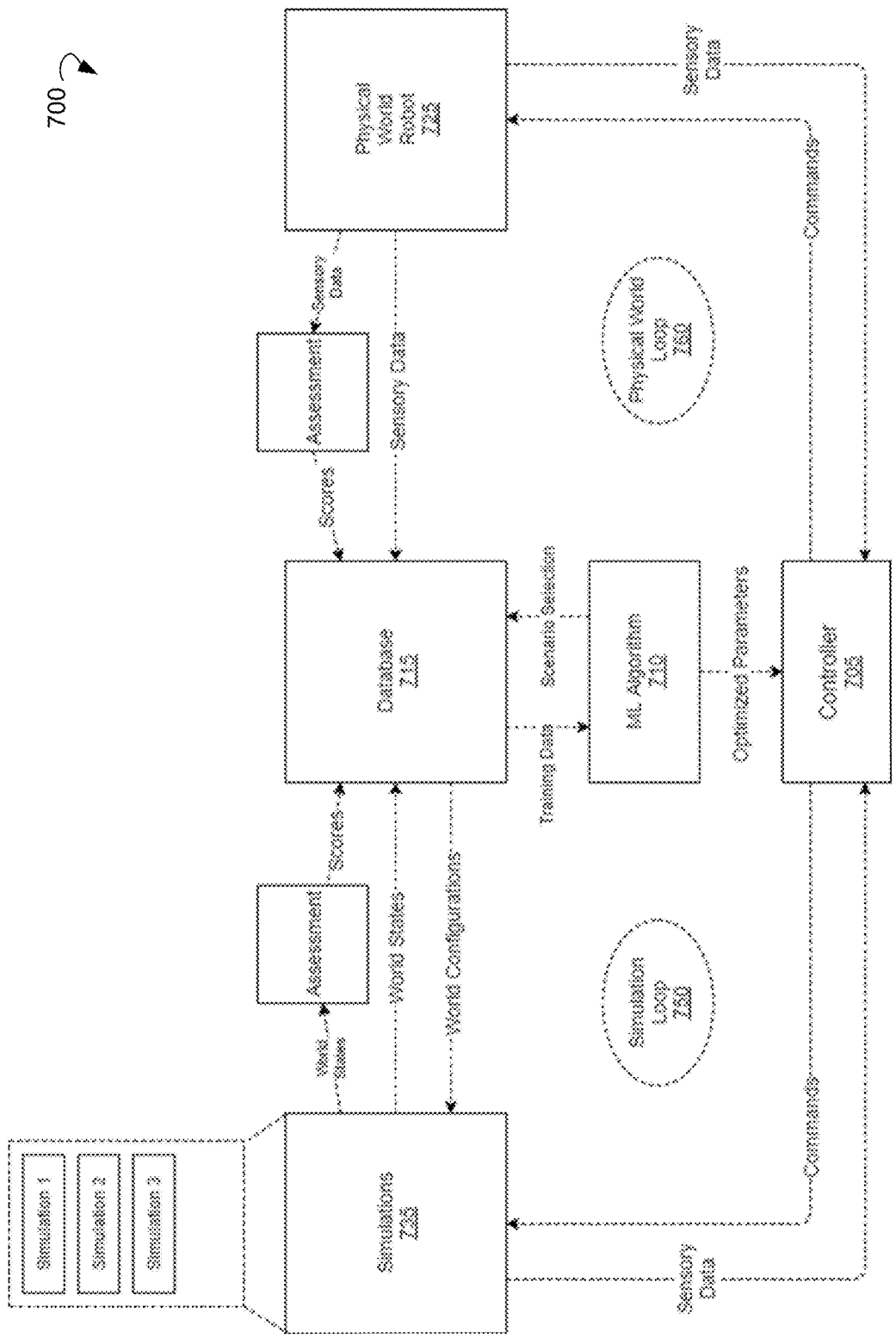
FIG. 7 is a block diagram showing an example machine learning process, according to an example embodiment.

FIG. 7 is a block diagram showing an example machine learning process 700 encompassing training in a simulated environment and physical world. The process 700 may include a simulation loop 750 and a physical world loop 760.

In the simulation loop 750, a controller 705 processes simulated sensory data to generate commands for execution by the robot 725. The simulated sensory data can be generated from the world state of simulations 735. The controller 705 may include a parameterized function of the sensory data, for example, an artificial neural network. There may be multiple simulations 735 running in parallel, each associated with an independent controller instance.

As the simulation steps progress in time, the simulated worlds may transition from a past state into a future state. An assessment of this transition and/or the involved states may take place with respect to completion of the task. The degree of success is reflected in score values. The score values can be stored together with other required information in a database 715.

A machine learning (ML) algorithm 710, such as Q-Learning, may use the stored data points to optimize the parameters of the controller(s) 705 to improve execution of the task, i.e. obtain better scores.

The ML algorithm 710 may select different scenarios to be simulated. Relevant information to facilitate this selection may also be stored in the database 715. The relevant information may include, for example, different objects to grasp. Associated configuration data which is descriptive of the world, can be loaded initially into a new simulation. Thus, controller 705 can be trained to cope with a variety of situations.

In the real world loop 760, training of real world robots is similar to simulations with that exception that exact states are not known. Hence scores can be derived from sensor data exclusively. This sensor data can be obtained from sensors that are present exclusively for training purposes. Furthermore, configuration of training scenarios can require physical interaction, for example, placing of an object to be grasped. The configuration process can be automated or performed manually as required.

The training procedure can perform, depending on the algorithmic details, simulated tasks and task in the real world in any order, or omit some tasks. Collected data samples can supplements each other and can be stored in a common database 715. However, the collected data from the real world may be given a higher relevance.

Thus, methods and systems for optimizing a robot control program in a physics-based simulated environment using machine learning have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for optimizing a robot control program in a physics-based simulated environment using machine learning, the system including:
    a physically plausible virtual runtime environment to simulate a real environment for a simulated robot;
    a test planning and testing component operable to:
        define a robotic task;
        generate a plurality of virtual test cases for the robotic task;
        determine a control strategy for executing the plurality of virtual test cases and initial parameters for the control strategy; and
        create the physics-based simulated environment; and
    a robot controller operable to:
        based on the control strategy, execute the plurality of virtual test cases in parallel in the physics-based simulated environment;
        measure a success of the execution of each of the plurality of virtual test cases;
        store training and validation data to a historical database, the training and validation data including at least measurements of success of the execution of the plurality of virtual test cases;
        train a machine learning algorithm using the training and validation data; and
        continuously execute the plurality of virtual test cases while using the machine learning algorithm to adjust parameters of the control strategy until one or more optimal test cases are determined; wherein the robot controller is further operable to: execute the one or more optimal test cases on a physical robot; measure a success of the execution for each of the one or more optimal test cases on the physical robot in view of the robotic task; and based on the measurements of success, select at least one optimal test case from the one or more optimal test cases.

2. The system of claim 1, wherein the plurality of virtual test cases for the robotic task correspond to different plausible situations associated with the physical robot.

3. The system of claim 2, wherein the plausible situations include behavioral variations by which the simulated robot explores a space of possible states in order to find an optimal policy to execute the robotic task.

4. The system of claim 1, wherein generating the plurality of virtual test cases includes:
    determining the physically plausible virtual runtime environment for a simulated robot; and
    creating a plurality of plausible tests for the control strategy, the plurality of plausible tests being designed to execute the robotic task.

5. The system of claim 4, wherein the creating the physics-based simulated environment includes:
    generating sensory inputs for the physically plausible virtual runtime environment;
    using the machine learning algorithm to map the sensory inputs to commands for the simulated robot to carry out in order to perform the robotic task; and
    determining physical forces exerted by the simulated robot and reaction forces of an object on which the physical forces are inserted are simulated.

6. The system of claim 1, wherein the training and validation data includes sets of inputs and corresponding desired outputs from the historical database.

7. The system of claim 1, wherein the measuring the success of the execution of a virtual test case of the plurality of virtual test cases is indicative of a success of performing the robotic task.

8. The system of claim 1, wherein the measurement the success of the execution of the plurality of virtual test cases is based on a degree of success of completing the robotic task.

9. The system of claim 1, wherein the machine learning algorithm includes Artificial Neural Networks.

10. A method for optimizing a robot control program in a physics-based simulated environment using machine learning, the method comprising:
- defining a robotic task;
- generating a plurality of virtual test cases for the robotic task;
- determining a control strategy for executing the plurality of virtual test cases and initial parameters for the control strategy; and
- creating the physics-based simulated environment; and
- based on the control strategy, executing the plurality of virtual test cases in parallel in the physics-based simulated environment;
- measuring a success of the execution of each of the plurality of virtual test cases;
- storing training and validation data to a historical database, the training and validation data including at least measurements of success of the execution of the plurality of virtual test cases;
- training a machine learning algorithm using the training and validation data; and
- continuously executing the plurality of virtual test cases while using the machine learning algorithm to adjust parameters of the control strategy until one or more optimal test cases are determined; and executing the one or more optimal test cases on a physical robot; measuring a success of the execution for each of the one or more optimal test cases on the physical robot in view of the robotic task; and based on the measurements of success, selecting at least one optimal test case from the one or more optimal test cases.

11. The method of claim 10, wherein the plurality of virtual test cases for the robotic task correspond to different plausible situations associated with the physical robot.

12. The method of claim 11, wherein the plausible situations include behavioral variations by which a simulated robot explores a space of possible states in order to find an optimal policy to execute the robotic task.

13. The method of claim 10, wherein generating the plurality of virtual test cases includes:
- determining a physically plausible virtual runtime environment for a simulated robot; and
- creating a plurality of plausible tests for the control strategy, the plurality of plausible tests being designed to execute the robotic task.

14. The method of claim 13, wherein the creating the physics-based simulated environment includes:
- generating sensory inputs for the physically plausible virtual runtime environment;
- using the machine learning algorithm to map the sensory inputs to commands for the simulated robot to carry out in order to perform the robotic task; and
- determining physical forces exerted by the simulated robot and reaction forces of an object on which the physical forces are inserted are simulated.

15. The method of claim 10, wherein the training and validation data includes sets of inputs and corresponding desired outputs from the historical database.

16. The method of claim 10, wherein the measure of success is indicative of a success of performing the robotic task.

17. The method of claim 10, wherein the machine learning algorithm includes Artificial Neural Networks.

18. A system for optimizing a robot control program in a physics-based simulated environment using machine learning, the system including:
- a physically plausible virtual runtime environment to simulate a real environment for a simulated robot;
- a test planning and testing component operable to:
  - define a robotic task;
  - generate a plurality of virtual test cases for the robotic task, wherein generating the plurality of virtual test cases includes:
    - determining the physically plausible virtual runtime environment for a simulated robot; and
    - creating a plurality of plausible tests for the control strategy, the plurality of plausible tests being designed to execute the robotic task;
  - determine a control strategy for executing the plurality of virtual test cases and initial parameters for the control strategy; and
  - create the physics-based simulated environment, wherein the creating the physics-based simulated environment includes:
    - generating sensory inputs for the physically plausible virtual runtime environment;
    - using a machine learning algorithm to map the sensory inputs to commands for the simulated robot to carry out in order to perform the robotic task; and
    - determining physical forces exerted by the simulated robot and reaction forces of an object on which the physical forces are inserted are simulated; and
- a robot controller operable to:
  - based on the control strategy, execute the plurality of virtual test cases in parallel in the physics-based simulated environment;
  - measure a success of the execution of each of the plurality of virtual test cases;
  - store training and validation data to a historical database, the training and validation data including at least measurements of success of the execution of the plurality of virtual test cases;
  - train a machine learning algorithm using the training and validation data;
  - continuously execute the plurality of virtual test cases while using the machine learning algorithm to adjust parameters of the control strategy until one or more optimal test cases are determined;
  - execute the one or more optimal test cases on a physical robot;
  - measure a success of the execution for each of the one or more optimal test cases on the physical robot in view of the robotic task; and
  - based on the measurements of success, select at least one optimal test case from the one or more optimal test cases.

* * * * *